United States Patent [19]

McCambridge

[11] 4,362,280
[45] Dec. 7, 1982

[54] METHOD AND APPARATUS FOR REDUCING DESTRUCTIVE EFFECTS OF TORNADOS

[76] Inventor: Joseph McCambridge, 12 Watson La., Setauket, N.Y. 11733

[21] Appl. No.: 205,676

[22] Filed: Nov. 10, 1980

Related U.S. Application Data

[63] Continuation-in-part of Ser. No. 12,513, Feb. 15, 1979, abandoned.

[51] Int. Cl.³ .............. B64C 39/02; A01G 15/00; E01H 13/00
[52] U.S. Cl. .................................. 244/1 TD; 244/3; 244/199; 244/73 R; 239/2 R; 239/14
[58] Field of Search .............. 244/1 TD, 3, 34 A, 65, 244/68, 73 R, 198, 199; 239/2 R, 14; 415/2 R, 2 A, 3 A, 72, 151; 416/176

[56] References Cited

U.S. PATENT DOCUMENTS

| 2,229,564 | 1/1941 | Hagan ........................... 244/73 R |
| 2,385,392 | 9/1945 | Van Dusen ...................... 244/3 |
| 2,903,188 | 9/1959 | Hutchinson .................... 239/2 R |
| 3,596,854 | 8/1971 | Haney ............................. 244/199 |
| 4,166,596 | 9/1979 | Mouton et al. ................. 415/7 |

FOREIGN PATENT DOCUMENTS

| 834296 | 2/1952 | Fed. Rep. of Germany ..... 239/2 R |
| 781059 | 8/1957 | United Kingdom ................ 244/3 |
| 568033 | 9/1977 | U.S.S.R. ............................ 239/2 R |

Primary Examiner—Charles E. Frankfort
Attorney, Agent, or Firm—Robert E. Burns; Emmanuel J. Lobato; Bruce L. Adams

[57] ABSTRACT

A method of reducing the destructive effects of a tornado, which has a rotary motion about a center and has at least one clear air inflow region at its periphery, comprises towing through the inflow region one or more fluid dynamic converters which impart a rotary motion to a column of air and thereby disturb the balance of the rotary motion of the tornado so as to reduce its intensity. The fluid dynamic converter comprises a cylindrical casing which is towed in a lengthwise direction by an airplane and has inside the casing a screw-like vane which imparts a rotary motion to the airstream flowing through the casing.

17 Claims, 3 Drawing Figures

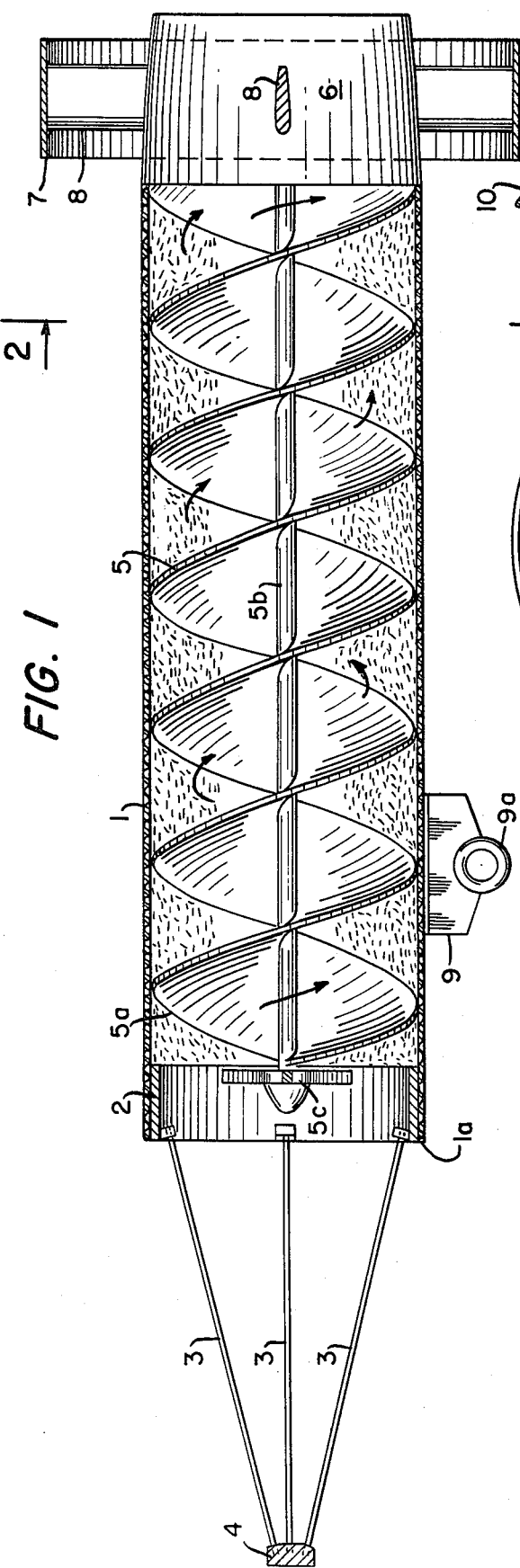
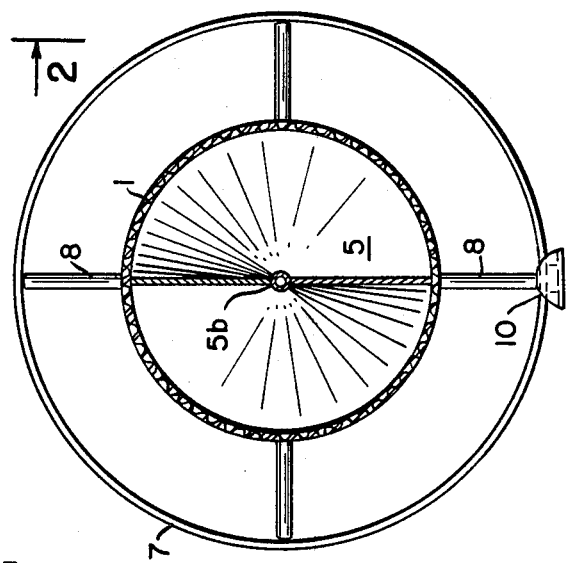
FIG. 1
FIG. 2

METHOD AND APPARATUS FOR REDUCING DESTRUCTIVE EFFECTS OF TORNADOS

REFERENCE TO PRIOR APPLICATION

This application is a continuation-in-part of my application Ser. No. 012,513 filed Feb. 15, 1979 and now abandoned in favor of the present application.

FIELD OF INVENTION

The present invention relates to a method and apparatus for reducing the destructive effects of a violent storm having a rotary motion about a center. The invention is particularly applicable to concentrated storms of limited area such as tornados and cyclones.

BACKGROUND OF INVENTION

A tornado is a violent rotating column of air which is usually funnel-shaped and is associated with thunder storm and cloud activity. While tornados have been recorded throughout the United States, the areas most affected are Texas, Oklahoma, Kansas and Missouri. Tornados also occur in other parts of the world as in West Africa and India. Each year tornados cause thousand of dollars of damage.

A great deal of research has been carried out with respect to the causes of tornados and the prediction of tornado activity so as to provide early warning. One significant development is the use of doppler radar in the study of tornados. Through the use of doppler radar and visual observation, much has been learned of the structure and motion of tornados and numerous articles on this subject have been published. Among these are the following:

Airflow and Precipitation Trajectories Within Severe Local Storms Which Travel to the Right of the Winds; By: Keith A. Browning;
Journal of The Atmospheric Sciences November 1964 Volume 21 Pages 634 to 639;
Wake Vortex Structure and Aerodynamic Origin in Severe Thunderstorms By Leslie R. Lemon;
Journal of The Atmospheric Sciences April 1976 Volume 33, No. 4, Pages 678 to 685.

It has been observed that severe local storms in the northern hemisphere travel to the right of the winds in the middle troposphere. Such storms are referred to by Browning as SR storms (S for "severe" and R for "right"). The storms travel in a general direction from west to east. Rain—frequently very heavy—generally occurs to the north and east of the center of the storm while hail frequently occurs to the northwest and west. In a south southwest quadrant the air is usually clear.

In the northern hemisphere tornados generally rotate in a counterclockwise (anticyclonic) direction. Up drafts and down drafts coexist continuously in the storm, each gaining kinetic energy not only from a conversion of potential energy but also directly from the kinetic energy of the relative horizontal inflow. The tendency of severe local storms to travel to the right of the winds increases the flux of air entering both the up and down drafts. Horizontal flow continues to converge anticyclonically toward the eddy center. The relative motion of the winds in the lower and middle troposphere toward the storm's right flank is responsible for the characteristic organization and structure of this kind of storm.

Efforts have been made not only to forecast but also to reduce the tremendous devasting effect of such storms, for example by cloud seeding. However, no significant success has been achieved in reducing damage done by tornados.

SUMMARY OF THE INVENTION

The present invention is primarily directed to reducing the destructive effects of violent storms such as tornados by mechanical means. A primary purpose of the invention is to reduce the damaging funnel effect of tornados and thereby dissipate their tremendous force. The present invention is premised on the principle that by affecting one part of the tornado so as to disturb the balance of the rotating system, the force of a tornado can be dissipated or at least mitigated. The approach is made not in the immediate funnel formation or cloud formation but rather on the perimeter of the storm and in particular the region of horizontal air inflow. The present invention seeks to reduce the destructive effects of a violent storm such as a tornado having a rotary motion about a center and having at its periphery at least one air inflow region by propelling through such inflow region in a direction opposite to the direction of air flow at least one fluid dynamic converter which imparts a rotary motion to a column of air and thereby disturbs the balance of the rotary motion of the storm so as to reduce its intensity. The fluid dynamic converter used in carrying out the invention comprises a generally cylindrical hollow casing which is propelled or towed in a lengthwise direction through an air inflow region at the periphery of the storm. Inside the casing there are provided screw means for imparting a rotary motion to the air passing through the converter.

One or more such fluid dynamic converters are towed by or mounted on an aircraft which flies through an air flow region of the storm in a direction opposite to the air flow. As it would be dangerous to fly through heavy rain or hail, the aircraft flies through the air flow region at the periphery of the storm where the air is clear. Such region can be readily ascertained by doppler radar and—as stated above—is ordinarily in the south-southwest quadrant.

BRIEF DESCRIPTION OF DRAWINGS

The nature, objects and advantages of the invention will appear more fully from the following description of the construction and use of a preferred example of a fluid dynamic converter illustrated in the drawings in which:

FIG. 1 is a somewhat schematic longitudinal section of a fluid dynamic converter in accordance with the invention;

FIG. 2 is a cross section taken approximately on the line 2—2 in FIG. 1; and

DESCRIPTION OF PREFERRED EMBODIMENT

Figure 3:
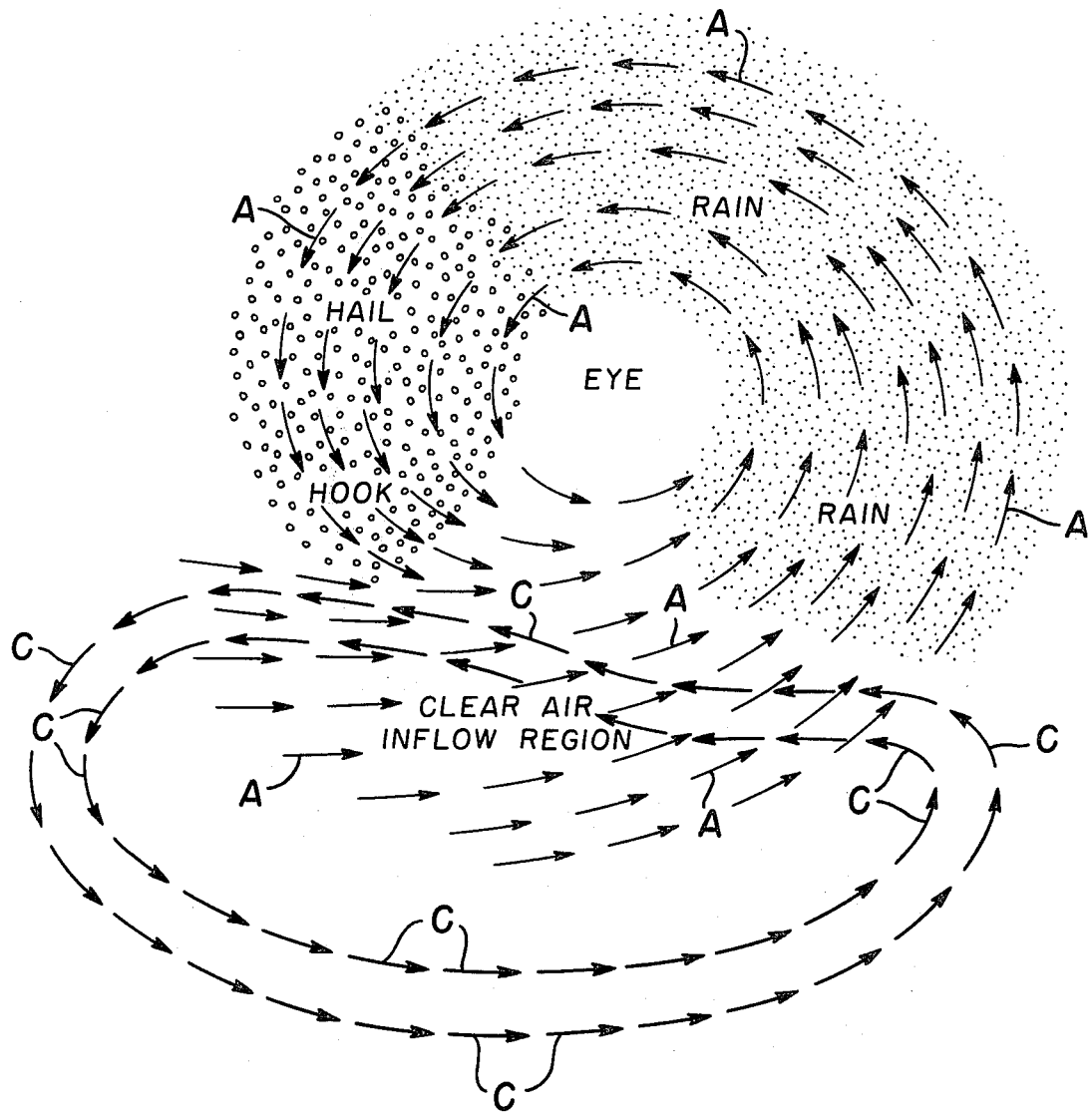
FIG. 3 is a schematic representation of a tornado at middle level with an indication of the path through which fluid dynamic converters in accordance with the invention are propelled.

The fluid dynamic converter shown by way of example in the drawings comprises an elongate cylindrical casing or sleeve 1 formed of strong yet lightweight material. For example the casing 1 may be formed of aluminum or magnesium sheet metal, fibreglass reinforced plastic or strong fabric such as canvas. When the casing 1 is formed of fabric as shown by way of example in the drawings, there is provided at its leading end a reinforcing ring 2 formed for example of metal or plastic reinforced with fibreglass. The size of the casing may vary, but preferably its length is at least twice its diameter. Thus by way of example, the casing may have a diameter of four to six feet and a length of eight to twelve feet.

Suitable means is provided for propelling the fluid dynamic converter in a lengthwise direction through a clear air inflow region at the periphery of a tornado while restraining it from rotation. Such means is illustrated by way of example in the drawings as comprising a plurality of leads 3 which are securely attached to and extend forwardly from the reinforcing ring 2 to a fixed coupling 4 by means of which the fluid dynamic converter can be coupled to an airplane for towing it through the clear air inflow region of the tornado. The leads 3 may, for example, be formed as hollow tubes in order to restrain the casing 1 from rotation. Alternatively the casing can be mounted on an aircraft but it is presently preferred to tow it behind the aircraft. It will be understood that as the casing is propelled through the air at high speed, a column of air will pass through the casing in a lengthwise direction.

In accordance with the invention means is provided in the casing for imparting a rotary motion to the column of air which flows through the casing. Such means is illustrated by way of example as comprising a screw 5 which is fixed inside the casing 1. The screw is illustrated as comprising a thin vane formed, for example, of lightweight metal or fibreglass reinforced plastic which extends lengthwise in the casing 1 and is twisted helically so as to impart rotary motion to the column of air which passes through the casing. It will be noted that the leading edge 5a of the screw is spaced somewhat rearwardly of the leading edge 1a of the casing so that air can enter the casing and begin its flow through the casing before engaging the screw. In order effectively to impart rotary motion to the air, the screw should make at least two complete turns in the length of the casing. It will be understood that the screw 5 is secured at its circumference to the casing 1 so that it is fixed in relation to the casing. For greater strength the screw 5 is shown as having a small shaft 5b, the front end of which is supported from the reinforcing ring 2 by a three-arm spider 5c.

The direction of rotation imparted to the column of air passing through the casing 1 is such as to disrupt the normal flow of air in the clear air inflow region of the tornado so as to disturb the balance of the rotating system of the tornado and thereby dissipate its energy. In the northern hemisphere, the direction of rotation imparted to a column of air by the fluid dynamic converter should preferably be in a clockwise direction as viewed looking into the front of the converter.

It will be understood that by reason of the reaction of the air on the screw 5, the screw and hence the casing will be subjected to a torque in a direction opposite to that of the rotary motion imparted to the air column. The screw and casing and the coupling provided by the leads 3 are sufficiently strong to withstand this torque so that the fluid dynamic converter is held against rotation. While the helical screw is shown by way of example as being of uniform pitch throughout its length, the pitch can, if desired, be varied. For example the pitch can be greater at the leading end of the screw and progressively decrease so as to provide a progressive acceleration of the rotary motion imparted to the column of air passing through the casing.

At the trailing end of the casing 1 there is provided a tail piece 6 which is slightly tapered so as to shape and concentrate the rotary air column emerging from the fluid dynamic converter. The tail piece 6 is formed of material having sufficient rigidity and strength, for example lightweight metal or fibreglass reinforced plastic.

Moreover, at the tail end of the casing 1 there is provided stabilizing means shown as comprising a stabilizing ring 7 which surrounds and is spaced from the tail piece 6 and a plurality of vanes 8 which extend radially outwardly from the tail piece 6 to the stabilizing ring 7. The vanes 8 are not inclined but rather lie in planes passing through the central longitudinal axis of the casing 1, their purpose being to cooperate with the ring 7 in stabilizing passage of the fluid dynamic converter through the air in a lengthwise direction.

To provide for landing and take off when towed behind an airplane, the fluid dynamic converter is provided with simple landing gear. This is illustrated by way of example in the drawings as comprising a front unit 9 located about a third of the way back from the front end of the casing and a rear unit 10 on the lower side of the stabilizing ring 7. The front unit 9 can, if desired, be a simple skid plate but is shown as comprising small wheels 9a. The rear unit 10 comprises a curved skid plate which protects the stabilizing ring 7 from damage when the fluid dynamic converter is towed along a runway during take off, landing or taxiing.

In accordance with the method of reducing the destructive effects of a violent storm in accordance with the present invention, the storm is observed, for example by the use of doppler radar, to locate a clear air inflow region at the periphery of the storm where the velocity is the greatest. One or more fluid dynamic converters in accordance with the invention are then propelled through the clear air inflow region in a direction that is approximately tangential to the rotating storm system and is opposite to the direction of air flow of the storm as illustrates schematically in FIG. 3 in which the direction of air flow is indicated by arrows A while the paths along which fluid dynamic converters are propelled are indicated by arrows C. Depending on observation of the storm, the approach is generally at mid or low level. The speed at which the fluid dynamic converters are towed through the inflow region will depend on the equipment available but will ordinarily be between 200 and 600 knots with a preferred speed of about 400 knots. The rotary motion imparted to the column of air flowing through the fluid dynamic converter is designed to disrupt the normal flow of the storm system so as to upset its balance and thereby contribute to dissipation of its energy. It will be understood that in attacking a storm system, it is desirable to use a plurality of fluid dynamic converters in accordance with the invention in order to increase their effectiveness. Thus for example insofar as equipment is available, it would be desirable to use approximately 50 aircraft each having two to six smaller units mounted on the wings and each towing two or three larger units. Moreover, as indicated in FIG. 3, the aircraft would fly in an eliptical path so as to return outside the perimeter of the storm and fly repeatedly through the clear air inflow region.

It will be understood that the mechanical approach to reducing the destructive effects of violent rotary storms in accordance with the present invention has distinct advantages over previously proposed methods such as cloud seeding in that fluid dynamic converters in accordance with the invention are inexpensive and can repeatedly be reused. The only material consumed is the fuel required for the towing aircraft. The method in accordance with the present invention is thus both practical and economical.

While a preferred embodiment of a fluid dynamic converter in accordance with the present invention has been illustrated in the drawings and is herein particularly described, it will be understood that many variations and modifications in the converter can be made and that the invention is thus in no way limited to the illustrated embodiment.

What is claimed is:

1. A method of reducing the destructive effects of violent storms having a rotary motion about a center and having at its periphery at least one clear air inflow region, which comprises propelling through said inflow region in a direction approximately tangential to the storm and opposite to the direction of air flow in said inflow region a plurality of fluid dynamic converters each imparting a rotary motion to a column of air and thereby disturbing the balance of the rotary motion of the storm and reducing its intensity, each of said fluid dynamic converters comprises a generally cylindrical elongate hollow casing wide open at both ends, means for moving said casing lengthwise through the air while restraining it from rotation, and fixed screw means fixed in said casing for imparting a rotary motion to air entering the open front end of said casing and passing through said casing as said casing is moved lengthwise through the air.

2. A method according to claim 1, in which said rotary motion is in a clockwise direction when viewed from the front of said fluid dynamic converter.

3. A method according to claim 1, in which a plurality of said fluid dynamic converters are mounted on an airplane.

4. A method according to claim 1, in which said screw means comprises a spiral vane fixed in said casing and making at least two complete turns in the length of said casing.

5. A method according to claim 4, in which said spiral vane extends through a major portion of the length of said casing.

6. A method according to claim 1, in which a plurality of said fluid dynamic converters are moved lengthwise through the air by being towed by an airplane while being restrained from rotation.

7. A fluid dynamic converter for reducing the destructive effects of a violent storm having rotary motion about a center, comprising a generally cylindrical elongate hollow casing wide open at both ends, means for moving said casing in a lengthwise direction through a clear air inflow region at the periphery of said storm in a direction approximately tangential to the storm and opposite to the direction of air flow in said inflow region, means for restraining said casing against rotation, and fixed screw means fixed in said casing for imparting a rotary motion to air entering the open front end of said casing and passing through said casing as said casing is moved lengthwise through the air.

8. A fluid dynamic converter according to claim 7, in which said screw means comprises a spiral vane fixed in said casing.

9. A fluid dynamic converter according to claim 8, in which said spiral vane makes at least two complete turns in the length of said casing.

10. A fluid dynamic converter according to claim 9, in which said spiral vane extends through a major portion of the length of said casing.

11. A fluid dynamic converter according to claim 7, in which said casing has a tapered portion at its stern.

12. A fluid dynamic converter according to claim 7, in which said casing has at its stern a stabilizing ring surrounding and radially spaced from a stern portion of said casing and a plurality of vanes connecting said stabilizing ring with said stern portion of said casing.

13. A fluid dynamic converter according to claim 7, in which said casing is of fabric.

14. A fluid dynamic converter according to claim 7, in which said casing has a diameter of 4 to 6 feet and a length of 8 to 12 feet.

15. A fluid dynamic converter according to claim 7, in which said means for moving said casing in a lengthwise direction comprises leads secured to the front end of said casing and means for connecting said leads to an airplane, whereby said fluid dynamic converter is towed by said airplane while held against rotation.

16. A fluid dynamic converter according to claim 15, in which said casing is provided with landing gear for supporting said fluid dynamic converter on a runway during take-off, landing and taxiing.

17. A fluid dynamic converter according to claim 7, in which the length of said casing is at least twice its diameter.

* * * * *